United States Patent
Wilson

(10) Patent No.: US 9,554,170 B2
(45) Date of Patent: Jan. 24, 2017

(54) METHOD AND SYSTEM TO CONFIRM CO-LOCATION OF MULTIPLE DEVICES WITHIN A GEOGRAPHIC AREA

(71) Applicant: NAGRAVISION S.A., Cheseaux-sur-Lausanne (CH)

(72) Inventor: Robin Wilson, Mountain View, CA (US)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/361,667

(22) PCT Filed: Nov. 27, 2012

(86) PCT No.: PCT/EP2012/073740
§ 371 (c)(1),
(2) Date: May 29, 2014

(87) PCT Pub. No.: WO2013/079485
PCT Pub. Date: Jun. 6, 2013

(65) Prior Publication Data
US 2014/0337867 A1    Nov. 13, 2014

Related U.S. Application Data

(60) Provisional application No. 61/613,339, filed on Mar. 20, 2012, provisional application No. 61/564,713, filed on Nov. 29, 2011.

(51) Int. Cl.
*G01S 19/14* (2010.01)
*H04N 21/258* (2011.01)
(Continued)

(52) U.S. Cl.
CPC ......... *H04N 21/25841* (2013.01); *G01S 19/14* (2013.01); *H04N 21/42202* (2013.01);
(Continued)

(58) Field of Classification Search
CPC .... H04N 21/25841; H04N 7/16; H04N 5/445; H04N 21/42202; H04W 48/04; H04W 64/00; G06F 13/00; G06F 3/00
(Continued)

(56) References Cited

U.S. PATENT DOCUMENTS

| | | | |
|---|---|---|---|
| 5,621,793 A | * | 4/1997 | Bednarek et al. ............ 380/240 |
| 5,781,150 A | * | 7/1998 | Norris .................... G01C 21/20 |
| | | | 342/357.34 |

(Continued)

FOREIGN PATENT DOCUMENTS

| | | |
|---|---|---|
| WO | WO 99/53624 | 10/1999 |
| WO | WO 2011/003099 | 1/2011 |

OTHER PUBLICATIONS

International Search Report issued in International Application No. PCT/EP2012/073740, dated Feb. 15, 2013.
(Continued)

*Primary Examiner* — Nathan Flynn
*Assistant Examiner* — Caroline Somera
(74) *Attorney, Agent, or Firm* — DLA Piper LLP (US)

(57) ABSTRACT

A method and system to confirm co-location of multiple devices within a geographic area, while filtering spurious alarms, is provided. An example method comprises processing first GPS data obtained from a first GPS sensor and second GPS data obtained from a second GPS sensor. A sensing data evaluator compares a sensing error from the first GPS data and a sensing error from the second GPS data. Based on the result of the comparing, the sensing data evaluator determines whether the sensing errors are to be ignored. An approach where an alarm that otherwise would be generated is disabled or canceled may be termed as filtering spurious alarms.

21 Claims, 6 Drawing Sheets

(51) Int. Cl.
- *H04N 21/45* (2011.01)
- *H04W 4/02* (2009.01)
- *H04N 21/422* (2011.01)
- *H04N 21/658* (2011.01)
- *G01S 19/07* (2010.01)
- *G01S 19/25* (2010.01)

(52) U.S. Cl.
CPC ..... *H04N 21/4524* (2013.01); *H04N 21/6582* (2013.01); *H04W 4/021* (2013.01)

(58) Field of Classification Search
USPC .............................. 725/9, 48, 25, 71; 709/224
See application file for complete search history.

(56) References Cited

U.S. PATENT DOCUMENTS

| | | | | |
|---|---|---|---|---|
| 5,952,959 A * | 9/1999 | Norris | ...................... | 342/357.34 |
| 6,100,806 A * | 8/2000 | Gaukel | ...................... | 340/573.4 |
| 6,108,365 A | 8/2000 | Rubin et al. | | |
| 6,529,131 B2 * | 3/2003 | Wentworth | ................ | 340/573.1 |
| 6,611,742 B1 * | 8/2003 | Sand et al. | ...................... | 701/36 |
| 7,271,717 B1 * | 9/2007 | Amos | ...................... | 340/539.15 |
| 8,196,169 B1 * | 6/2012 | Herz | ................ | H04N 21/25841 725/25 |
| 8,887,307 B2 * | 11/2014 | Chen | ................ | 726/29 |
| 2004/0000994 A1 * | 1/2004 | Kuo | ...................... | 340/539.13 |
| 2004/0021567 A1 * | 2/2004 | Dunn | ...................... | G01S 19/51 340/539.13 |
| 2005/0040944 A1 * | 2/2005 | Contestabile | ............ | 340/539.13 |
| 2006/0020960 A1 | 1/2006 | Relan et al. | | |
| 2011/0004893 A1 * | 1/2011 | Borislow | ............... | H04N 7/165 725/25 |
| 2011/0055862 A1 * | 3/2011 | Harp et al. | ...................... | 725/25 |
| 2012/0293330 A1 * | 11/2012 | Grant et al. | ............... | 340/568.8 |
| 2014/0145878 A1 * | 5/2014 | Barlett | ................... | G01S 19/09 342/357.46 |
| 2015/0065167 A1 * | 3/2015 | Scalisi | ................... | H04W 8/02 455/456.1 |

OTHER PUBLICATIONS

Written Opinion issued in International Application No. PCT/EP2012/073740, dated Feb. 15, 2013.

* cited by examiner

METHOD AND SYSTEM TO CONFIRM CO-LOCATION OF MULTIPLE DEVICES WITHIN A GEOGRAPHIC AREA

CROSS REFERENCE TO RELATED APPLICATIONS

This application is a U.S. National Stage Application of International Application No. PCT/EP2012/073740 filed Nov. 27, 2012, which claims priority from U.S. Provisional Patent Application Nos. 61/564,713 filed Nov. 29, 2011 and 61/613,339, filed Mar. 20, 2012.

TECHNICAL FIELD

This application relates to a method and system to confirm co-location of multiple devices within a geographic area.

BACKGROUND

In Pay Television (TV) it is common practice to price the use of second and subsequent set top boxes (STBs) in a single home at a much lower rate and often at a fixed monthly fee. For example, the use of the first STB is billed at the full rate taking account of all premium services, while the use of any additional STB may be billed at a reduced rate yet still be configured to receive all of the premium services. For example, the use of the first STB and operator services may be billed at a rate of $70 per month, while the use of the second STB may be billed at a fixed rate of $5. This billing practice, which is quite common, is vulnerable to abuse, where a subscriber orders service for additional STBs and offers service for the additional STBs for use by their neighbors who then take advantage of the reduced fee. The additional STBs may thus provide services to a second dwelling and thereby avoid the payment of the full rate for services in the second dwelling. This is a common form of piracy.

BRIEF DESCRIPTION OF DRAWINGS

Embodiments described herein are illustrated by way of example and not limitation in the figures of the accompanying drawings, in which like reference numbers indicate similar elements and in which.

DETAILED DESCRIPTION

Figure 1:
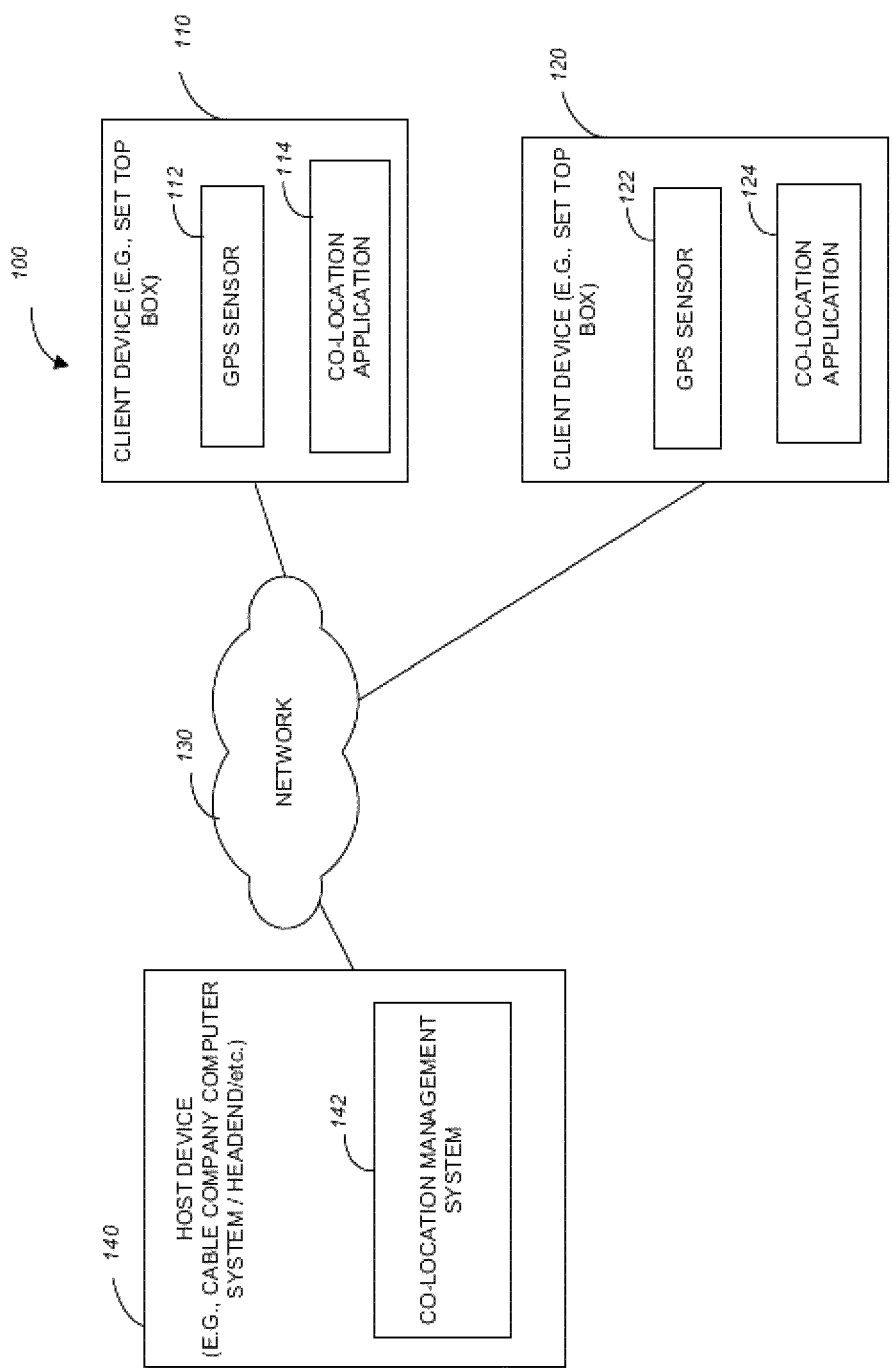
FIG. 1 is a diagrammatic representation of a network environment within which an example method and system to confirm co-location of multiple devices within a geographic area may be implemented.

Described are methods and systems to confirm co-location of multiple receiver devices within a geographic area (e.g., co-location of multiple STBs within a home or otherwise-defined viewing location (e.g., a defined area encompassing a building or several buildings)). Some embodiments extend to a machine-readable medium embodying instructions which, when executed by a machine, cause the machine to perform any one or more of the methodologies described herein. Other features will be apparent from the accompanying drawings and from the detailed description that follows. In the following description, for purposes of explanation, numerous specific details are set forth in order to provide a thorough understanding of an embodiment of the methodologies described herein It will be evident, however, to one skilled in the art that the methodologies described herein may be practiced without these specific details.

Example embodiments of the methodologies described herein include approaches that seek to counter the form of piracy where a subscriber orders service for additional STBs and provides the additional STBs to a second dwelling (e.g., a neighbor) who then takes advantage of the reduced fee and avoids the payment of the full rate for the services in the second dwelling. In one example embodiment, a system is provided to locate, using a global positioning system (GPS) and other technologies (e.g., cellular triangulation, IP address, and so on), a detected location of each of two or more subscriber devices (e.g., STBs). Thereafter, a determination is made if the two or more subscriber devices are all located within a reference geographical zone or footprint associated with the subscriber (e.g., that the STBs been declared by a consumer as being located in the same home). In an example embodiment, to improve the accuracy of determining the position of the two or more subscriber devices, some of the errors that occur in GPS sensing applications are cancelled out completely, or at least reduced.

Further, methods may also be deployed where the GPS receivers (also referred to as GPS sensors), provided within respective subscriber devices, are optimized to perform under low signal strength conditions that are typically found indoors and that are often considered unfavorable for most GPS sensing applications.

The example methods described herein may leverage special circumstances associated with the nature of receiver devices to be located. For example, it may be assumed that an STB is seldom moved from one location to another within a home and, accordingly, it can also be assumed that a GPS receiver can be allowed to take hours or even days to identify the exact position of an STB. Both of these assumptions—the static nature of the position of the receiver device to be located and the length of time a GPS sensor can take to identify the position of the target device—are divergent to normal GPS receiver optimization (e.g., a GPS receiver in an automobile navigation system). When the receiver devices are STBs, if a violation of a proximity requirement for two STBs is detected, an action may be triggered. For example, when it is detected that at least one of the STBs is outside of a reference geographical zone, one or more actions may be triggered. In another example embodiment, when the distance between two STBs exceeds a reference separation distance, one or more actions may be triggered. In an example embodiment, various actions may be triggered at a headend of a broadcast network or at a server of a broadcast network. The headend or server may be configured to process GPS data received from the STBs to determine if a violation has occurred. Example actions triggered by a violation may trigger may include disabling TV services for the violating STBs. In an example embodiment, the receiver devices (e.g., STBs) are configured to have the computational power and connectivity to permit them to communicate with each other in a home without assistance from a headend-based server.

Example embodiments include methods for enhancing or augmenting spatial accuracy of the results provided by GPS sensors and for enhancing GPS sensitivity. As mentioned above, while some example techniques are described with reference to STBs, the methods and systems described herein can be deployed in any devices are located within a geographic zone (e.g., located within a certain relatively small known geographic area).

Example Enhancing of Spatial Accuracy

Errors in the accuracy of GPS sensing may be attributed to several factors. Table 1 below provides some examples of the sources of GPS sensing errors (Sources in GPS Errors; www.Kowoma.de).

TABLE 1

| Source of GPS Error | Estimation of resultant error |
| --- | --- |
| (a) Ionospheric effects | ±5 meters |
| (b) Shifts in the satellite orbits | ±2.5 meter |
| (c) Clock errors of the satellites' clocks | ±2 meter |
| (d) Tropospheric effects | ±1 meter |
| (e) Calculation and rounding errors | ±0.5 meter |
| (f) Multipath effect | ±1 meter |

Errors for items (a), (b), (c), and (d) may be canceled out when considering that the relative positions of STBs is the same geographical zone such as a home, since the errors may be identical to all STBs in the same home. The errors may be cancelled out as the GPS satellite signal passes via an identical path from the GPS satellite to the receiver device and, accordingly, is subject to identical distortions. Even though the receivers may be some distance (e.g., 5 or 10 meters) apart, the distortions via the atmosphere are common to both paths.

The spatial errors resulting from item (c) (the clock errors of the satellites' clocks) would be common to all STBs within the same geographical zone (e.g., dwelling). The reason for this is that as the receiver devices are located within a relatively small geographical footprint, the clock should be derived from the same satellite for all STBs within the same dwelling. Thus, the clock-derived errors may be assumed to be common to all STBs within the same dwelling for any given error calculations with respect to any satellite.

Accordingly, the spatial errors on all STBs within the same dwelling should be the same. Therefore the relative spatial error with respect to two or more STBs within the same dwelling can be cancelled out to zero. The same logic may be applied to shifts in satellite orbits (item (b) in Table 1 above) for a system using the same satellite with respect to all STBs within the same dwelling.

Ionospheric and Tropospheric errors (items (a) and (d) in Table 1) should also be common to all STBs within the same dwelling and thus also cancel out. It should, however, be noted that there is a small angle (generally an infinitesimally small angle) between the signal path from the same GPS satellite to one STB as compared to another STB. Assuming, for example, a 5 meter spacing between the STBs and a satellite orbiting 20,000 km above, the angular difference is Tangent of 5 divided by 20,000,000, or 1/4,000,000, or 0.00000025=0.000014 degrees. It will thus be appreciated that, although the errors do not cancel absolutely, they are greatly reduced.

Calculation and rounding errors (item (e) in the Table 1) can also be cancelled through the use of common arithmetic blocks in all GPS receivers and by avoiding truncating values that are only critical for absolute accuracy (see below). As these are relatively small in most GPS applications, they may be therefore ignored in some example embodiments. When calculations are performed using digital arithmetic, it is common practice to truncate parts of the calculation beyond what is needed to avoid unwieldy long numbers. The decision is typically made to round or truncate part of the calculation including rounding or truncating the result of the calculation. This is often an acceptable practice since there is normally no need to have the calculation accuracy much higher than, for example, one tenth the combined errors of all the other errors. In the scenario described herein, the other errors are being reduced significantly, and the calculation errors need to be reduced as well.

Two example ways to reduce the aforementioned calculation errors in STBs including GPS receiver devices are provided below.

(A) A difference between two raw location inputs from two STBs is determined before beginning of the calculation. Thus, rounding errors are common to calculations involving the two STBs and the difference between the two raw location inputs is a much smaller number to start with. This may require both STBs sharing the raw information prior to beginning of the calculation. For example, if the two STBs are networked, they may communicate with each other.

(B) An alternative method is to recognize that the signal present at the GPS receiver is of a much higher resolution than is needed for the purpose of determining whether the STB hosting the GPS receiver is within a geographical zone associated with a dwelling and to adjust the truncation and rounding errors to be one or two order of magnitude less.

Thus, in an example embodiment, only multipath errors are left after utilizing approach (A) or approach (B), and some portion of these errors can be assumed to be common to all STBs within a home.

An example method and system to confirm co-location of multiple receiver devices within a geographic area or zone may be implemented in the context of a network environment 100, as shown in FIG. 1.

As shown in FIG. 1, the network environment 100 may include client devices 110 and 120 and a host device 140. The host device 140 may be a TV headend device, a server computer system, or any device capable of hosting a co-location management system 142. The host device 140 may be referred to as a co-location management server. The client devices 110 and 120 may be equipped with respective GPS sensors 112 and 122 and may also run respective co-location applications 114 and 124. The client devices 110 and may be STBs or other devices for which co-location within a defined geographical zone (e.g., a dwelling) may need to be confirmed. The client devices 110 and 120 may be in communication with the host device 140 via a communications network 130. The communications network 130 may be a network such as the Internet, a mobile phone communication network, or any other network capable of communicating digital data.

In one example embodiment, the co-location management system 142 may be configured to confirm that two or more objects (including GPS receivers) are located within a certain predetermined geographic area and/or within a certain distance of each other. The co-location management system 142, which may be hosted at a headend of a TV broadcast network or at a server computer system, collects GPS data from GPS receivers provided with respective objects and associated with the same geographical zone (e.g., STBs that have been declared as located in the same home). The data provided from GPS sensors to the co-location management system 142 may be first analyzed or processed prior to being sent to the co-location management system 142.

The data collected at the GPS sensors may include errors that may be indicative of a need to trigger an alarm (e.g., an alarm communicating that the target device is not within the expected geographic area). As explained by way of example above, some GPS sensor errors can be assumed to be the same for objects that are in close proximity (as in a case of STBs that are physically located in the same home). Accordingly, these errors cancel each other out and can thus be ignored because, for example, the GPS signal passes via identical paths from the GPS satellite to the GPS receivers of each object (e.g., STB) and thus suffer identical distortions. The co-location management system 142 may be configured to compare respective sensing errors from the GPS sensors of the receiver devices and, if the respective errors are common to both GPS sensors, cancel or disable the alarm.

Figure 2:
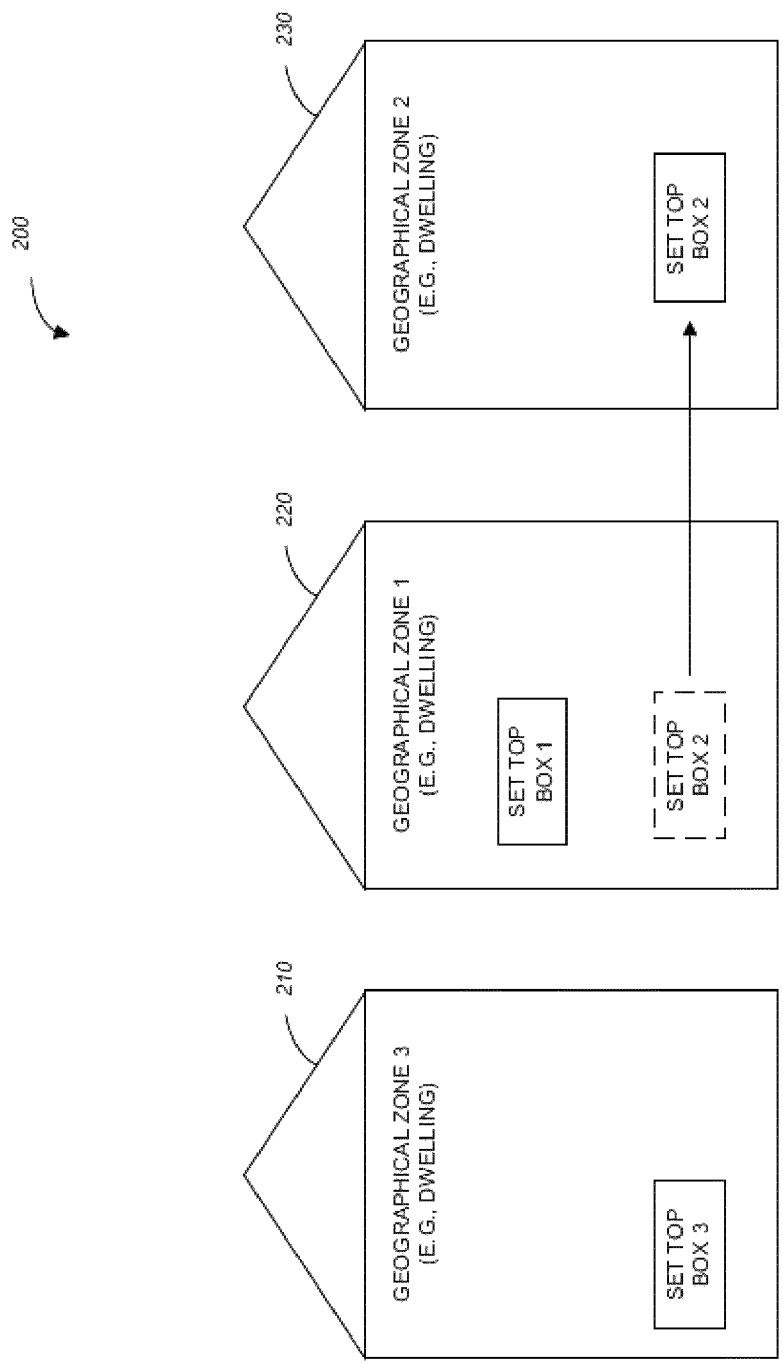
FIG. 2 is a diagrammatic representation of an environment to which an example method and system to confirm co-location of multiple devices within a geographic area may be applied.

FIG. 2 is a diagrammatic representation of an environment 200 to which an example method and system to confirm co-location of multiple devices within a geographic area may be applied. The environment 200 includes geographical zones 1, 2, and 3 identified with respective reference numerals 220, 230, and 210. Each of the geographical zones 1, 2, and 3 may be associated with respective homes (dwellings). FIG. 2 illustrates that set top box 2, originally located (or declared as located) at the dwelling 220 may be moved to the dwelling 230. The data collected at a GPS sensor provided with the set top box 2 may include errors that may be indicative of a need to trigger an alarm communicating that the set top box 2 is no longer within the dwelling 220.

Figure 3:
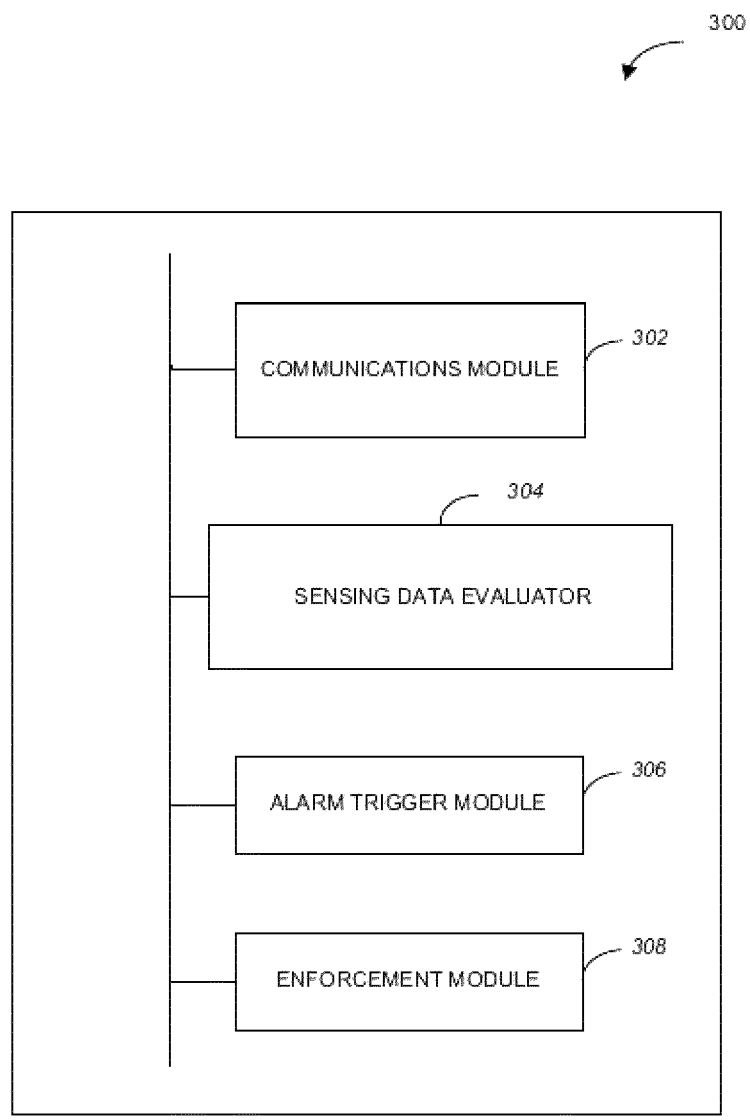
FIG. 3 is a block diagram of a system to confirm co-location of multiple receiver devices while filtering spurious alarms, in accordance with an example embodiment.

FIG. 3 is a block diagram of a system 300 to confirm co-location of multiple devices while filtering spurious alarms, in accordance with an example embodiment. The system 300 may be used to implement the functionality of the co-location management system 142 of FIG. 1.

As shown in FIG. 3, the system 300 includes a communications module 302, a sensing data evaluator 304, and an alarm trigger module 306. The communications module 302 may be configured to receive (e.g., from the client devices 110 and 120 of FIG. 1, directly or via one or more intermediary devices) first GPS data from a first sensor in a first client device (e.g., STB) and second GPS data from a second sensor in a second client device (e.g., STB). The first sensor may be provided (e.g., integrated within) the client device 110 and the second sensor may be provided (e.g., integrated within) the client devices 120 (see FIG. 1). These client devices 110, 120 (or any further client devices associated with a reference geographical zone) may be STBs located in a subscriber's home or/and declared by a subscriber as being located within the subscriber's home. The sensing data evaluator 304 may be configured to determine a distance between the two client devices 110 and 120 (or any number of client devices) based on respective received GPS data. Thereafter, the determined distance is compared with a reference distance that signifies a permitted distance between the client devices. For example, the reference distance may be based on the size a dwelling where the two STBs are deemed to reside. If the result of the comparison indicates that the distance between the client devices 110 and 120 is greater than the reference distance, or that at least one of the client devices is outside of a predetermined geographic area or zone, the alarm trigger module 306 generates an alarm. In an example embodiment, information indicating the predetermined geographic area within which the client devices 110 and 120 are expected to be located may be in a form of metadata. The metadata may reside at the host device 140 of FIG. 1 and may also be provided to the client devices 110 and 120 (or any other client devices authorized to be located within the predetermined geographical area).

The alarm generated by the alarm trigger module 306 may be followed by one or more further actions, such as stopping a service to one, or both, of the client devices 110 and 120. For example, if one of the client devices (e.g., the client device 120) is detected to be out of the predefined geographical area, service to the client device 102 may be terminated. The further actions may be executed by an enforcement module 308, also shown in FIG. 3. The enforcement module 308 may be configured to disable TV services to one of or both of client devices 110 and 120 (e.g., where the client devices 110 and 120 are STBs).

The sensing data evaluator 304 may also be configured to compare, using the at least one processor, a sensing error from the GPS data received from the client device 110 and a sensing error received from the GPS data the client device 120 and determine whether the sensing error (e.g., where certain GPS sensor errors are the same for both client devices 110 and 120) can be ignored (e.g., see Table 1). If the sensing data evaluator 304 determines that a sensing error should be ignored, an alarm that otherwise would be generated by the alarm trigger module 306 may be disabled or canceled (or ignored).

Figure 4:
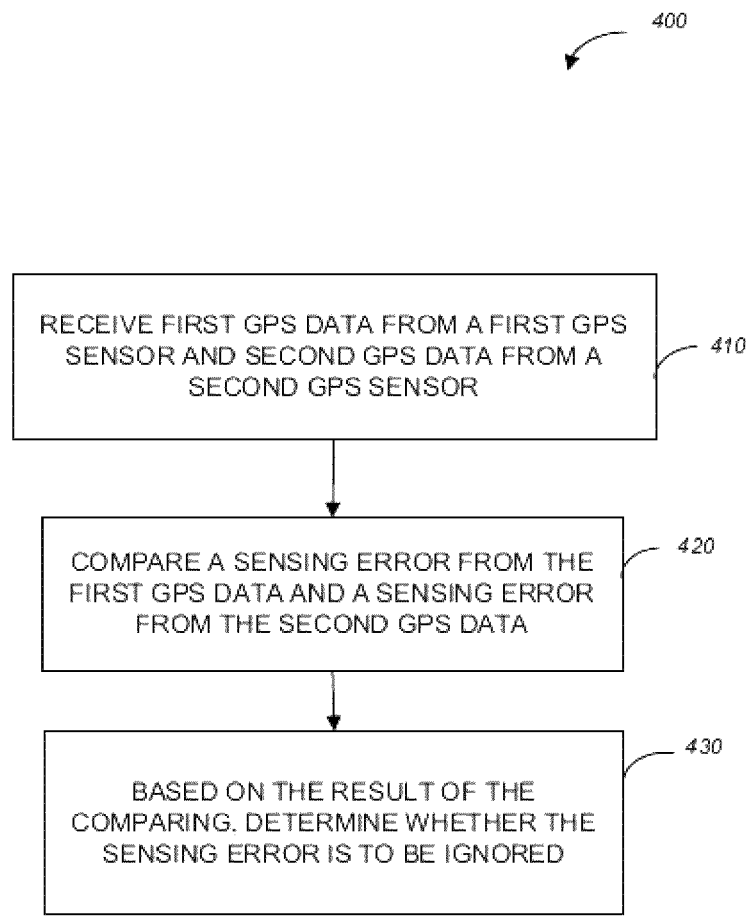
FIG. 4 is a flow chart of a method of confirming co-location of multiple receiver devices while filtering spurious alarms, in accordance with an example embodiment.

FIG. 4 is a flow chart of a method to confirm co-location of multiple devices while filtering spurious alarms, in accordance with an example embodiment. The method 400 may be performed by processing logic that may comprise hardware (e.g., dedicated logic, programmable logic, microcode, etc.), software (such as software run on a general purpose computer system or a dedicated machine), or a combination of both. In one example embodiment, the processing logic resides at the host device 140 of FIG. 1 and, in an example embodiment, at the system 300 shown in FIG. 3. Accordingly, the method 400 is described, by way of example, with reference thereto.

As shown in FIG. 4, the method 400 commences at operation 410, where the communications module 302 of FIG. 3 receives first GPS data from a first GPS sensor 112 of the first client device 110 and second GPS data from a second GPS sensor 122 in the second client device 120. At operation 420, the sensing data evaluator 304 compares a sensing error of the first GPS data and a sensing error of the second GPS data. Based on the result of the comparison, the sensing data evaluator 304, at operation 430, determines whether the sensing error is to be ignored (or acted upon by generating an alarm).

As explained by way of example above, the first and second GPS sensors 112, 122 may be provided, respectively, at the client devices 110 and 120 of FIG. 1. The communications module 302 and the sensing data evaluator 304 may be provided by the co-location management system 142 residing, for example, at a headend of a broadcast network (cable, satellite, or otherwise) or at a server computer system. In some example embodiments, the GPS data that is sent to the co-location management system 142 is first analyzed at the client devices 110, 120 each hosting a GPS sensor 112,122. If the sensing data evaluator 304 determines that the sensing error is to be ignored, an alarm that otherwise would be generated by the alarm trigger module 306 of FIG. 3, is disabled or canceled. Circumstances where an alarm that otherwise would be generated is disabled or canceled may be considered as filtering spurious alarms.

Figure 5:
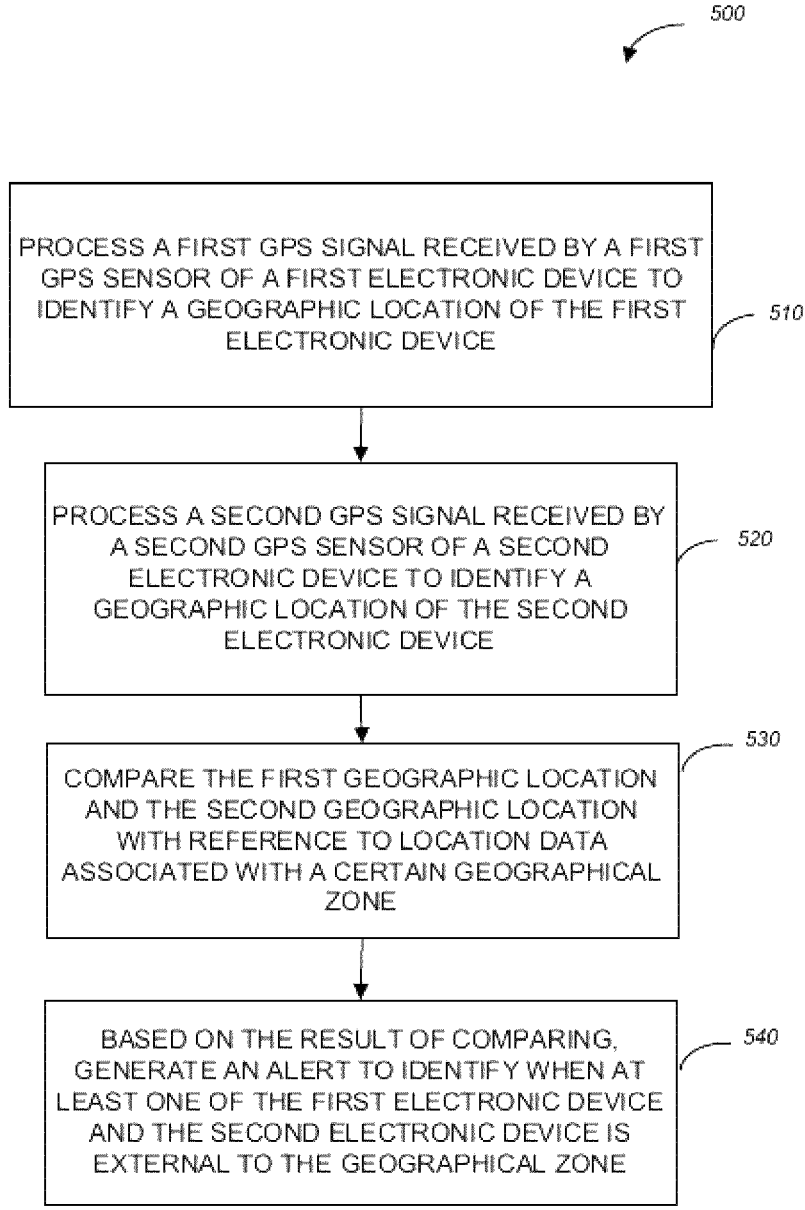
FIG. 5 is a flow chart of a method for monitoring co-location of electronic devices in a geographical zone, in accordance with an example embodiment.

FIG. 5 is a flow chart of a method 500 for monitoring co-location of electronic devices in a geographical zone, in accordance with an example embodiment. The method 500 may be performed by processing logic that may comprise hardware (e.g., dedicated logic, programmable logic, microcode, etc.), software (such as software run on a general purpose computer system or a dedicated machine), or a combination of both. In one example embodiment, the processing logic resides at the host device 140 of FIG. 1 and, in an example embodiment, at the system 300 shown in FIG. 3. Accordingly, the method 500 is described, by way of example, with reference thereto.

As shown in FIG. 5, the method 500 commences at operation 510, where the sensing data evaluator 304 processes a first GPS signal received by a first GPS sensor of a first electronic device to identify a geographic location of the first electronic device. At operation 520, the sensing data evaluator 304 processes a second GPS signal received by a second GPS sensor of a second electronic device to identify a geographic location of the second electronic device. At operation 530, the first geographic location is compared to the second geographic location with reference to location data associated with a certain geographical zone. At operation 540, based on the result of comparing, an alert is generated to identify when at least one of the first electronic device and the second electronic device is external to the geographical zone.

Example Augmenting/Enhancing of GPS Sensitivity.

GPS receivers are designed to operate under noisy environments; however, the tradeoffs that are required for mobile navigation applications are very different from the devices that are rarely moved to a different location. Accordingly, devices such as STBs can be deemed to be stationary devices. Two factors that may be considered in achieving improvement in the performance of the GPS receivers that may be deemed stationary are as follows:

(A) There is no requirement for the GPS receiver to acquire lock in a short period of time. Accordingly, a location application provided on stationary devices can still be of considerable utility and value if the GPS receivers were given hours or even days to lock. Thus, because the STBs do not move day to day, the validation time to ensure anti-piracy compliance can be set in terms of hours or even days.

(B) Because the STBs ordinarily do not move day to day, various phase lock loops and filters in an associated GPS receiver no longer have to be optimized to assume movement or the need to report a position that may need to be updated with a certain high frequency (e.g., every second). Instead, the update frequency on the position of an STB can be set to hours or even days. This further allows the receiver algorithms in devices considered to be immobile to be enhanced to ensure lock under much more arduous reception conditions than expected for mobile GPS devices.

In example embodiments, all STBs in a dwelling may share the same metadata from the broadcast network (e.g., a Pay TV headend). This metadata can augment satellite data to further increase accuracy and ease of lock under lower signal-to-noise ratios. In some example embodiments, the metadata may be provided from a device other than a headend, such as a server computer system, IP address, or the like. Metadata may include a time duration a GPS receiver may take to obtain a position lock, the location range within which the client device (e.g., an STB) is expected to be located, and so forth. Where the target device is an STB, the location range within which it is expected to be located may be determined based on the street address associated with the STB.

In one example embodiment, the operations performed to determine/confirm co-location of client devices within a certain geographic area may be described as follows with reference to an example cable service provider. A subscriber to the cable service registers his/her account at an agreed street address. This street address is normally defined as the one and only location where the requested service will be made available. Using conventional mapping databases, the location of the STB (or STBs) can be predetermined to be with a certain radius (e.g., 50 meters); the exact assumption depends on the accuracy of conventional commercial mapping databases. A GPS receiver provided within the STB can be initialized with a very limited range of position uncertainty. A conventional GPS receiver assumes it has no idea where on the entire planet it is on initialization, and the algorithms and noise filters are optimized for a worst-case situation that is not relevant to a meta-data assisted initialization, where the location is known to be within a certain distance of a certain geographical location. Thus, by constraining the uncertainty, a noise gain can be extracted. Thus, in an example embodiment, the GPS sensor provided in the STB may be assisted in obtaining an initial geographical location. For example, initial geographical location data may be derived from an IP address, input into the device upon installation, provided by the service provider (e.g., by accessing a subscriber database), and so on.

Figure 6:
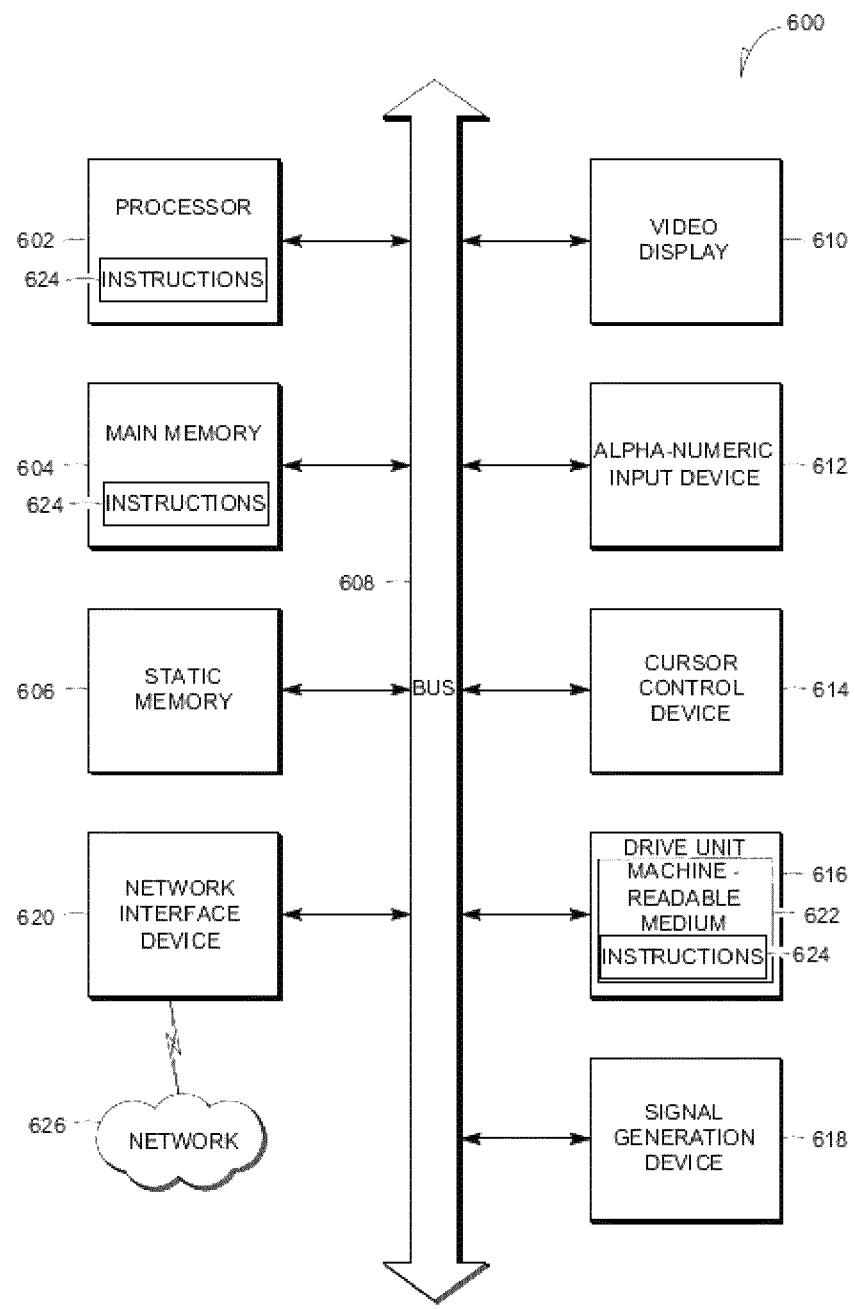
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a STB, a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT). The computer system 600 also includes an alphanumeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments described herein, or that is capable of storing and encoding data structures utilized by or associated with such a set of instructions. The term "machine-readable medium" shall accordingly be taken to include, but not be limited to, solid-state memories and optical and magnetic media. Such media may also include, without limitation, hard disks, floppy disks, flash memory cards, digital video disks, random access memory (RAM), read only memory (ROM), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. For example, while the embodiments described herein may relate to determining co-location of multiple STBs within a home, the techniques described herein may be utilized beneficially to determine co-location of other devices within a predetermined geographic area.

The invention claimed is:

1. A method for monitoring co-location of electronic devices in a geographical zone, the method comprising:
processing first global positioning system (GPS) data obtained using a first GPS sensor of a first electronic device;
processing second GPS data obtained using a second GPS sensor of a second electronic device;
comparing a sensing error from the first GPS data and a sensing error from the second GPS data; and
triggering an alarm unless the sensing errors from the first and second GPS data are substantially the same.

2. The method of claim 1, wherein the first GPS data identifies a geographic location of the first electronic device and the second GPS data identifies a geographic location of the second electronic device, said method further comprising:
comparing at least one of the geographic location of the first electronic device and the geographic location of the second electronic device with reference location data associated with the geographical zone; and
based on a result of this comparison, generating said alarm when at least one of the first electronic device and the second electronic device is external to the geographical zone.

3. The method of claim 1, further comprising:
transmitting the first GPS data and the second GPS data to a co-location management system via a communication network; and
wherein the processing of the first GPS data and the second GPS data is at said co-location management system.

4. The method of claim 1, wherein:
the processing of the first GPS data is at the first device; and
the processing of the second GPS data is at a the second device.

5. The method of claim 1, wherein:
the first sensor is provided at a first set top box, the first set top box being in communication with a television headend; and
the second sensor is provided at a second set top box, the second set top box being in communication with a television headend.

6. The method of claim 1, wherein said geographical zone is defined by a reference distance around a reference location.

7. The method of claim 1, comprising providing metadata to a system hosting any or both of said sensors, the metadata comprising GPS lock duration to be utilized by any or both of said sensors.

8. The method of claim 1, comprising providing metadata to a system hosting any or both of said sensors, the metadata comprising a predetermined geographic area associated with any or both of said sensors.

9. A computer-implemented system for monitoring co-location of electronic devices in a geographical zone, the system comprising:
at least one processor coupled to a memory;
a communications module configured to:
receive, at a co-location management system, first GPS data obtained using a first GPS sensor of a first electronic device; and
receive, at the co-location management system, second GPS data obtained from a second sensor obtained using a second GPS sensor of a second electronic device;
wherein the processor is configured to:
compare a sensing error from the first GPS data and a sensing error for the second GPS data; and
trigger an alarm unless the sensing errors from the first and second GPS data are substantially the same.

10. The system of claim 9, wherein the first GPS data identifies a geographic location of the first electronic device and the second GPS data identifies a geographic location of the second electronic device, and wherein the processor is further configured to:
  compare at least one of the geographic location of the first electronic device and the geographic location of the second electronic device with reference location data associated with the geographical zone; and
  based on a result of this comparison, generate said alarm when at least one of the first electronic device and the second electronic device is external to the geographical zone.

11. The system of claim 9, wherein the processor is located at a co-location management system.

12. The system of claim 11, wherein the co-location management system is associated with a television headend.

13. The system of claim 12, wherein:
  the first sensor is provided at a first set top box, the first set top box being in communication with the television headend; and
  the second sensor is provided at a second set top box, the second set top box being in communication with the television headend.

14. The system of claim 9, wherein the geographical zone is defined by a reference distance around a reference location.

15. The system of claim 9, wherein the communications module is configured to provide metadata to a system hosting any or both of said sensors, the metadata comprising GPS lock duration to be utilized by any or both of said sensors.

16. The system of claim 9, wherein the communications module is to provide metadata to a system hosting any or both of said sensors, the metadata comprising a predetermined geographic area associated with any or both of said sensors.

17. A machine-readable non-transitory storage medium having instruction data to cause a machine to:
  receive, at a co-location management system, first GPS data obtained using a first GPS sensor of a first electronic device;
  receive, at the co-location management system, second GPS data obtained from a second sensor obtained using a second GPS sensor of a second electronic device;
  compare a sensing error from the first GPS data and a sensing error from the second GPS data; and
  trigger an alarm unless the sensing errors from the first and second GPS data are substantially the same.

18. The method of claim 1, wherein the first and second GPS sensors are given hours to lock.

19. The method of claim 1, wherein the first and second GPS sensors are given days to lock.

20. The method of claim 1, wherein the first GPS data identifies a geographic location of the first electronic device and the second GPS data identifies a geographic location of the second electronic device, said method further comprising:
  determining a distance between the geographic location of the first electronic device and the geographic location of the second device; and
  triggering the alarm if the distance exceeds a permitted distance.

21. The system of claim 9, wherein the first GPS data identifies a geographic location of the first electronic device and the second GPS data identifies a geographic location of the second electronic device, and wherein the processor is further configured to:
  determining a distance between the geographic location of the first electronic device and the second geographic location of the device; and
  triggering the alarm if the distance exceeds a permitted distance.

* * * * *